(12) United States Patent
Zhang

(10) Patent No.: US 8,467,401 B1
(45) Date of Patent: Jun. 18, 2013

(54) SCHEDULING VARIABLE LENGTH PACKETS

(75) Inventor: Jiefan Zhang, High Wycombe (GB)

(73) Assignee: Altera Corporation, San Jose, CA (US)

( * ) Notice: Subject to any disclaimer, the term of this patent is extended or adjusted under 35 U.S.C. 154(b) by 1048 days.

(21) Appl. No.: 11/543,579

(22) Filed: Oct. 4, 2006

(51) Int. Cl.
*H04L 12/56* (2006.01)

(52) U.S. Cl.
USPC .......................... 370/412; 370/389; 370/429

(58) Field of Classification Search
USPC .............................................. 370/412, 468
See application file for complete search history.

(56) References Cited

U.S. PATENT DOCUMENTS

| | | | | |
|---|---|---|---|---|
| 5,870,629 | A * | 2/1999 | Borden et al. | 710/44 |
| 6,683,884 | B1 * | 1/2004 | Howard | 370/412 |
| 6,810,426 | B2 * | 10/2004 | Mysore et al. | 709/234 |
| 6,975,638 | B1 * | 12/2005 | Chen et al. | 370/412 |
| 7,349,405 | B2 * | 3/2008 | Deforche | 370/395.4 |
| 2003/0112802 | A1 * | 6/2003 | Ono et al. | 370/389 |
| 2003/0119556 | A1 * | 6/2003 | Khan et al. | 455/560 |
| 2008/0175270 | A1 * | 7/2008 | Kataria et al. | 370/468 |

OTHER PUBLICATIONS

"A Generalized Processor Sharing Approach to Flow Control in Integrated Services Networks: The Single-Node Case," Abhay K. Parekh, et al., *IEE/ACM Transactions on Networking*, vol. I, No. 3, Jun. 1993, pp. 344-357.
"Worst-case Fair Weighted Fair Queueing," Jon C.R. Bennett et al., *IEEE INFOCOMM'96*, Mar. 1996, pp. 120-128.

* cited by examiner

*Primary Examiner* — Dang Ton
*Assistant Examiner* — Pamit Kaur
(74) *Attorney, Agent, or Firm* — Ropes & Gray LLP

(57) ABSTRACT

A packet scheduler has input connections, and data packets received on the input connections can be placed in queues. The packet scheduler includes a first scheduler, for identifying a first of said queues according to a first queue scheduling algorithm, and a second scheduler, for identifying a second of said queues according to a second queue scheduling algorithm. The packet scheduler determines whether the first of said queues contains a packet of data to be sent and, if so, it selects the first of said queues as a selected queue. If the first of said queues does not contain a packet of data to be sent, it selects the second of said queues as a selected queue. The packet scheduler then determines whether the respective packet of data can be sent from the selected queue, by maintaining a deficit counter indicating a current data quota for the respective queue, and also by maintaining a global deficit counter.

20 Claims, 3 Drawing Sheets

SCHEDULING VARIABLE LENGTH PACKETS

BACKGROUND OF THE INVENTION

This invention relates to a packet scheduler, for use in allocating network resources to different sources of data traffic.

In a communications network, a connection between two network nodes (a source node and a destination node) has a predetermined bandwidth. That is, there is a maximum amount of data that the connection can handle in any particular time period.

The source node may be attempting to transmit data of different types, or from different originating devices. In that case, it is necessary to determine how the available bandwidth should be shared between the different types of data or the data from the different originating devices.

Many different methods have been proposed for determining how to allocate this available bandwidth. A common problem is to maximize the efficiency with which the available bandwidth is used, that is, bandwidth should only be made available to a queue that actually contains data for transmission, while also ensuring that the traffic queues are each treated "fairly", taking into account the fact that they need not all be treated equally, but that some queues may be given more bandwidth than others. At the same time, it is preferable that the scheduling method should not itself introduce much additional computational complexity into the system.

The document "A Generalized Processor Sharing Approach to Flow Control in Integrated Services Networks: The Single-Node Case", Abhay K. Parekh and Robert G. Gallager, IEEE/ACM Transactions on Networking, vol. 1, no. 3, June 1993, pages 344-357, describes the Generalized Processor Sharing method.

However, scheduling methods that emulate the Generalized Processor Sharing method are typically computationally complex, and are therefore usually most suitable for applications with fixed-length data packets, and/or low data rates.

SUMMARY OF THE INVENTION

According to an embodiment of a first aspect of the invention, there is provided a packet scheduler, in which a first scheduling algorithm is used to identify a first data queue, and a second scheduling algorithm is used to identify a second data queue. The first scheduling algorithm can be a scheduling algorithm that is able to produce a high degree of fairness between the queues when the queues are all busy. The second scheduling algorithm can be chosen such that it always selects a queue that contains data ready to send. Data can then be sent from the queue selected by the first scheduling algorithm, if that queue contains data, or from the queue selected by the second scheduling algorithm, if not.

According to a second embodiment of the invention, a deficit counter may be maintained for each queue, and a global deficit counter may also be maintained. Data may be sent from the selected queue if the packet size does not exceed the quota indicated by the deficit counter for the relevant queue. Alternatively, data may be sent from the selected queue if the quota indicated by the deficit counter for the relevant queue, and the quota indicated by the global deficit counter, are both positive.

The scheduler is thus able to handle variable size data packets with a high degree of fairness amongst the data queues, while also ensuring that the available bandwidth is used efficiently.

DETAILED DESCRIPTION OF PREFERRED EMBODIMENTS

Figure 1:
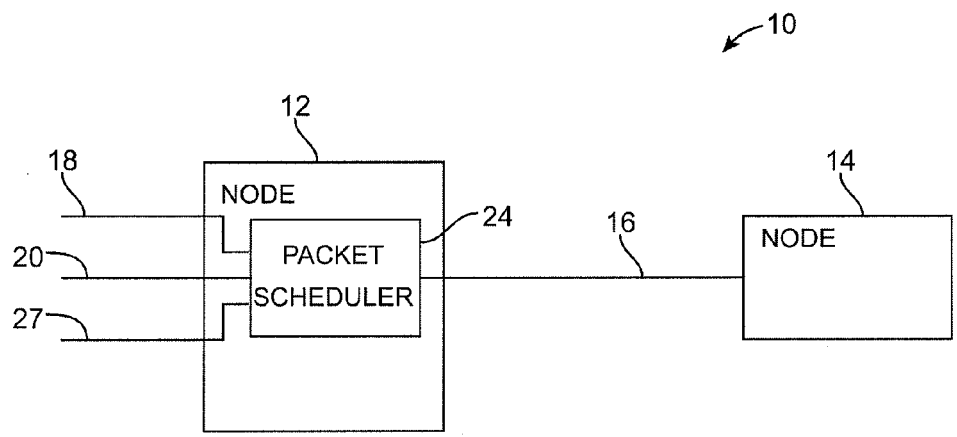
FIG. 1 is a block schematic diagram, illustrating a communications system in accordance with an aspect of the present invention.

FIG. 1 is a block schematic diagram, illustrating a part of a communications system. As shown in FIG. 1, the system 10 includes a first network node 12, and a second network node 14, connected by a communication path 16. For example, the communication path 16 may be a wired connection between the first node 12 and the second node 14, and the first and second nodes may be configured to transfer data packets. In the following description, the transfer of data packets from the first node 12 to the second node 14 will be considered in detail, although it will be appreciated that the transfer may take place in either direction, or in both directions.

It will be apparent to the person skilled in the art that the communication path 16 is partially defined by a maximum rate at which data can be transferred, that is, a maximum total number of bytes in any given time period. This is referred to as the bandwidth of the communication path 16.

In particular, the first node 12 and the second node 14 may be configured to transfer variable length data packets, although it will be apparent that the invention is also applicable to the situation where the first node 12 and the second node 14 are configured to transfer fixed length data packets.

As shown in FIG. 1, the first node has three separate input connections 18, 20, 22. These input connections may be connected to receive input data packets from separate data sources. That is, they may be connected to separate devices or network nodes, each of which may require to transmit data packets to the second node 14. Alternatively, two or more of the input connections may be connected to the same data source, but may be adapted to carry different traffic types.

Although FIG. 1 shows three separate input connections 18, 20, 22, it will be appreciated that the first node 12 may have any convenient number of input connections, and may have considerably more than three such input connections, and may be able to establish connections with any number of data sources.

Within the first node 12, the data packets received on the input connections 18, 20, 22 are passed to separate input queues in a packet scheduler 24. The function of the packet scheduler 24 is to determine how to allocate the bandwidth on the connection to the second node 14, between the input queues. More specifically, in each successive time period, the function of the packet scheduler is to determine which of the queues should be given the opportunity to transmit a data packet on the connection to the second node 14.

This function can take into account the fact that the queues may be given different priorities. For example data from one particular source may be treated more favourably because of a particular Quality of Service (QoS) agreement with that data source.

Figure 2:
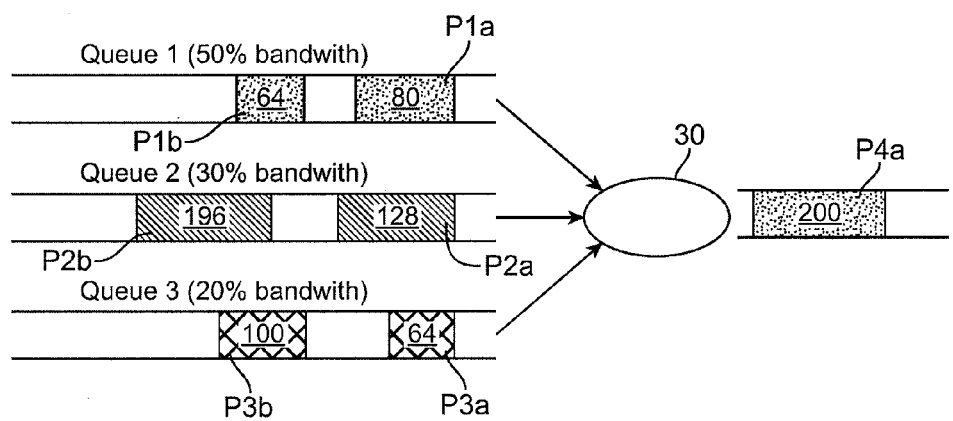
FIG. 2 is a schematic representation of traffic queues, in operation of an embodiment of the invention.

FIG. 2 illustrates one possible situation, where data has been received on three input connections, for example from three input queues. As will be recognized, there may be one queue for each input connection, or different types of received data may be placed into different queues.

Thus, a first queue, Queue 1; contains data packets P1a and P1b received on a first input connection; a second queue, Queue 2, contains data packets P2a and P2b received on a second input connection; and a third queue, Queue 3, contains data packets P3a and P3b received on a third input connection. As mentioned above, the packet scheduler 24 in accordance with the preferred embodiment of the invention is able to handle variable length packets. In this illustrated situation, the data packets P1a and P1b received on the first input connection have sizes 80 bytes and 64 bytes, respectively; the data packets P2a and P2b received on the second input connection have sizes 128 bytes and 196 bytes, respectively; and the data packets P3a and P3b received on the third input connection have sizes 64 bytes and 100 bytes, respectively. It will be appreciated that these sizes are indicated purely for the purposes of illustration.

FIG. 2 also indicates that, in this illustrated situation, the three queues are given different bandwidths. Specifically, this is represented by allocating the available bandwidth unequally between them, according to a set of configured weights. The allocated bandwidths represent that proportion of the available bandwidth that would be made available to the respective queues, if they required that allocation. Where one queue cannot use all of its allocated bandwidth, because it does not have enough data to send in a given time period, this spare bandwidth resource will be dynamically allocated to other queues. Moreover, this spare bandwidth is allocated to the other queues in proportion to their weights. Then, other queues which have enough data to send are able to obtain a higher proportion of the available bandwidth during this time period, than their allocated proportions would suggest.

More specifically, in this illustrated example, Queue 1 has a bandwidth allocation of 50% of the available bandwidth; Queue 2 has a bandwidth allocation of 30% of the available bandwidth; and Queue 3 has a bandwidth allocation of 20% of the available bandwidth.

The effect of these bandwidth allocations will be described in more detail below.

Information about the data packets in the three queues is passed to a processor 30, for performing the scheduling algorithm, as will be described in more detail below. An output traffic stream is then generated, for transmission over the connection 16. As shown in FIG. 2, this output traffic stream also contains data packets P4a, etc.

Figure 3:
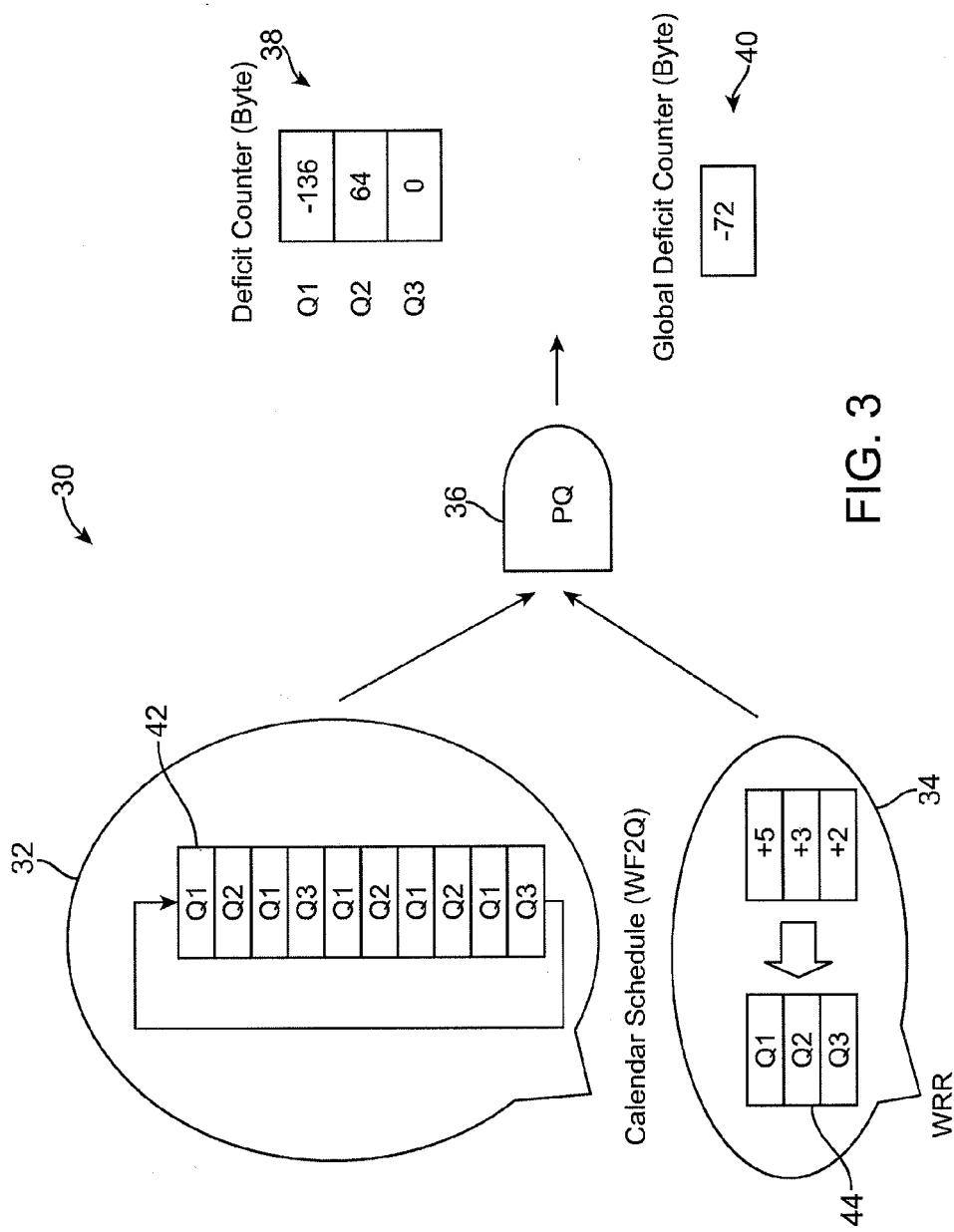
FIG. 3 is a further schematic diagram, illustrating the operation of the packet scheduler in the system of FIG. 1, in the case illustrated in FIG. 2.

FIG. 3 is a more detailed schematic diagram, illustrating the process performed in the processor 30. Specifically, the processor 30 is able to perform two separate scheduling algorithms, and then determines whether or not a packet can be transmitted from a selected queue.

Thus, the scheduler is a two-layer scheduler. In a bottom layer, it includes a first scheduler 32 and a second scheduler 34. The top layer is a priority queue (PQ) scheduler 36.

The scheduler also maintains a deficit counter 38 for each of the queues Q1, Q2, Q3, with the stored values in the respective deficit counters effectively indicating a quota of data (measured in bytes, for example) available for that queue. In this illustrated embodiment, the scheduler also maintains a global deficit counter 40, with the stored value effectively indicating a quota of data (measured in bytes, for example) available for the system as a whole. The use of the global deficit counter 40 makes the scheduler particularly useful in the situation where the data packets do not have affixed length, as it allows the scheduler to take account of the effect of different packet lengths.

In the illustrated embodiment, the first scheduler 32 is able to perform a calendar scheduling algorithm, in order to identify a first queue. The calendar scheduler 32 can be configured to emulate any desired scheduling method, for example any GPS (Generalized Processor Sharing) method. In this illustrated example, the first scheduler 32 emulates the Worst-case Fair Weighted Fair Queuing algorithm (WF2Q). This is described in more detail in the document "Worst-case Fair Weighted Fair Queuing", J. C. Bennett and H. Zhang, IEEE INFOCOMM'96, March 1996, pages 120-128. For the purposes of understanding the present invention, it is sufficient to recognize that the first scheduler defines a first order, in which the queues are examined.

Specifically, in the illustrative example shown in FIGS. 2 and 3, where Queue 1 has a bandwidth allocation of 50% of the available bandwidth, Queue 2 has a bandwidth allocation of 30% of the available bandwidth, and, Queue 3 has a bandwidth allocation of 20% of the available bandwidth, a sequence 42 of ten consecutive times slots is defined, divided between these queues in proportion to their bandwidth allocations. More specifically, the five time slots allocated to Queue 1 (Q1) alternate with the five time slots allocated to Queue 2 (Q2) and Queue 3 (Q3).

The first scheduler 32 therefore defines the first order, forming a calendar. During each time period, a pointer of the first scheduler 32 is used to indicate one of the queues, at one of the positions in the calendar. The pointer moves on to a subsequent position in the calendar during each subsequent time slot, unless all of the queues are empty. However, if the queue indicated by the pointer during a particular time slot is empty, that time slot is wasted by the calendar scheduler.

The first scheduler 32 therefore emulates the Worst-case Fair Weighted Fair Queuing algorithm, which can provide a well-formed output traffic sequence, but which can be somewhat inefficient if not all of the input traffic queues are busy.

In the illustrated embodiment, the second scheduler 34 is able to perform a weighted round robin (WRR) scheduling algorithm, in order to identify a backup queue, which will be scheduled if the first scheduler 32 selects an empty queue. In effect, the second scheduler defines a different order, in which the queues are examined.

Specifically, in the illustrative example shown in FIGS. 2 and 3, where Queue 1 has a bandwidth allocation of 50% of the available bandwidth, Queue 2 has a bandwidth allocation of 30% of the available bandwidth, and Queue 3 has a bandwidth allocation of 20% of the available bandwidth, a sequence 44 of ten consecutive times slots is defined, divided between these queues in proportion to their bandwidth allocations. More specifically, five time slots are allocated to Queue 1 (Q1), three time slots are allocated to Queue 2 (Q2) and two time slots are allocated to Queue 3 (Q3).

The second scheduler 34 therefore defines the different order mentioned above. During each time period, a pointer of the second scheduler 34 is used to indicate one of the queues, and each queue is indicated in a particular number of time slots consecutively, as will be described in more detail below. If the queue indicated by the pointer during a particular time slot is empty, the pointer selects the next queue in the order.

Thus, the first scheduler 32 and the second scheduler 34 each indicate one of the queues, and the priority queue scheduler 36 selects one of these queues, to determine whether the respective packet can be sent.

Figure 4:
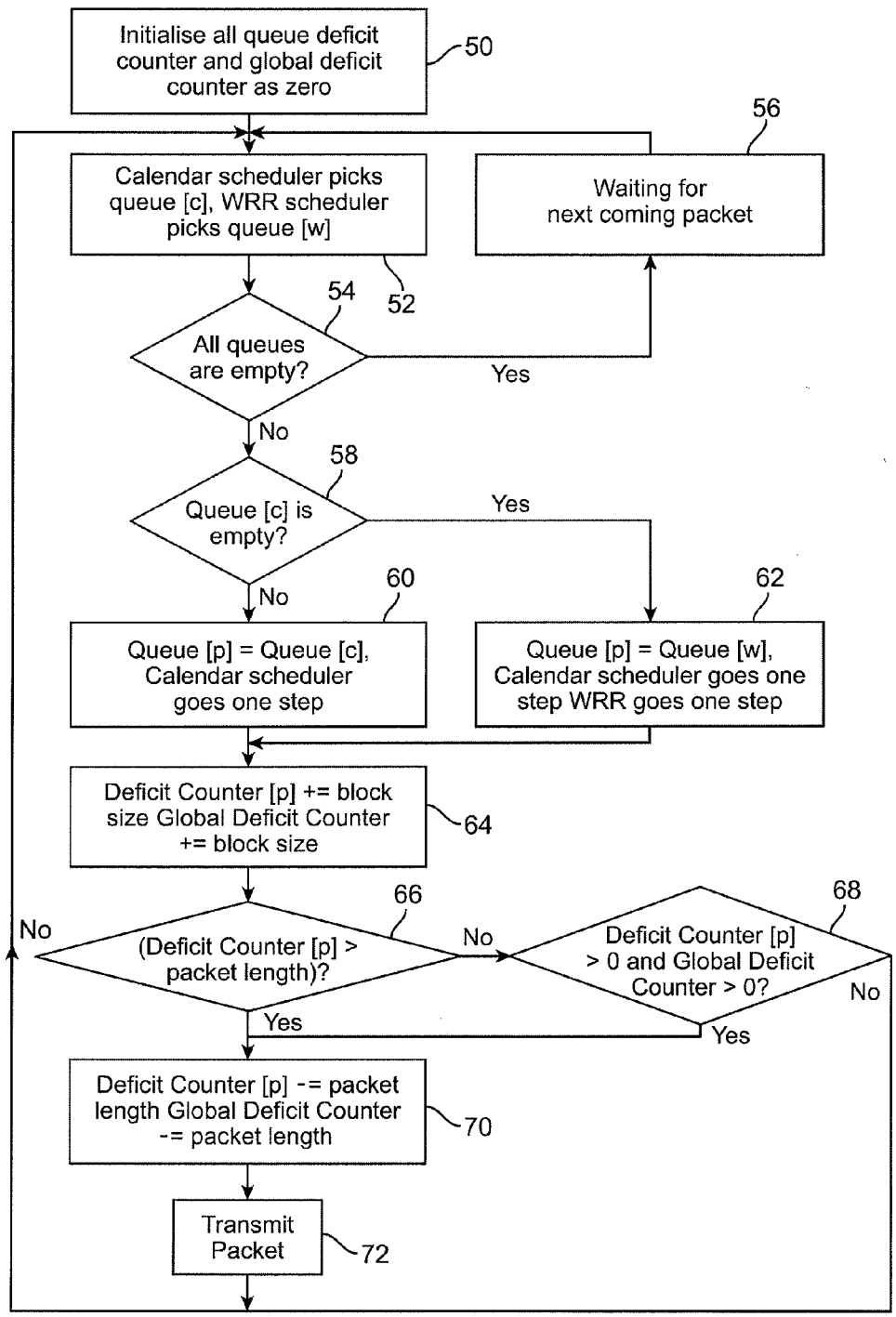
FIG. 4 is a flow chart, illustrating a process performed in the packet scheduler in the system of FIG. 1.

FIG. 4 is a flow chart, illustrating in more detail the process performed by the scheduler 30.

In an initial step, step 50, the deficit counters 38 for the individual queues and the global deficit counter 40 are initialized to zero.

Then, in a first time slot in step 52, the calendar scheduler 32 selects a first queue, queue [c], according to the first scheduling algorithm as described above, and the WRR scheduler 34 selects a second queue, queue [w], according to the second scheduling algorithm as described above. It will be noted that, during any given time period, the first and second queues may be the same, or different.

Then, in step 54, it is determined whether all of the queues Q1, Q2 and Q3 are empty. If so, the process passes to step 56, in which it waits for the next data packet to arrive, and can then return to step 52.

If it is determined in step 54 that not all of the queues Q1, Q2 and Q3 are empty, the process passes to step 58, in which it is determined whether the first queue, queue [c], is empty.

If it is determined in step 58 that the first queue, queue [c], is not empty, that is, that it contains at least one data packet awaiting transmission, the process passes to step 60, in which the first queue, queue [c], is considered to be the selected queue, queue [p].

If it is determined in step 58 that the first queue, queue [c], is empty, the process passes to step 62, in which the second queue, queue [w], is considered to be the selected queue, queue [p]. As described above, the WRR algorithm performed by the second scheduler 34 ensures that, if any queue contains a data packet, then the second queue, queue [w], will contain data. Thus, provided that not all of the queues Q1, Q2 and Q3 are empty, the selected queue, queue [p], will contain data. Also in step 60, the pointer associated with the calendar scheduler 32 advances to the next queue in the sequence stored in the calendar. Further, also in step 62, the pointer associated with the calendar scheduler 32 advances to the next queue in the sequence stored in the calendar, and the WRR scheduler 34 advances one step. Since, as described above, each queue is indicated in a particular number of time slots consecutively, this advance may mean that a different queue is indicated, or it may mean that the same queue is indicated for a further time slot.

Once a queue has been defined as the selected queue, queue [p], according either to step 60 or to step 62, the process passes to step 64, in which the deficit counter 38 associated with the selected queue, queue [p], and the global deficit counter 40, are each incremented by a fixed amount, referred to as the block size. In the illustrated embodiment, this fixed amount can for example be 64 bytes.

The fixed amount can be chosen to be any convenient amount, taking into account that the overall bandwidth is the product of the fixed amount and the schedule frequency, and also taking into account that a smaller fixed amount will tend to mean that the system has a shorter scheduling latency. Thus, in order to achieve a particular overall bandwidth, a smaller fixed amount will require a higher schedule frequency. In this illustrated example, this fixed amount is chosen to be equal to the minimum packet length.

It is then determined whether the next data packet in the selected queue can in fact be transmitted during that time slot. The process passes to step 66, in which it is determined whether the value of the deficit counter 38 associated with the selected queue, queue [p], is greater than or equal to the size of the next data packet in the selected queue. If so, it is determined that the packet can be transmitted.

If the value of the deficit counter 38 associated with the selected queue, queue [p], is not greater than the size of the next data packet in the selected queue, the process passes to step 68, in which it is determined whether the value of the deficit counter 38 associated with the selected queue, queue [p], and the value of the global deficit counter 40, are both positive. If so, it is determined that the packet can be transmitted.

If it is determined that the packet can not be transmitted, that is, it is determined in step 68 that the value of the deficit counter 38 associated with the selected queue and/or the value of the global deficit counter 40, is not positive, no data packet is transmitted, and the process returns to step 52, in order to repeat the process in the next time slot.

If it is determined either in step 66 or in step 68 that the packet can be transmitted, the process passes to step 70 in which the deficit counter 38 associated with the selected queue, queue [p], and the global deficit counter 40, are each decremented by the size of the packet to be transmitted. This therefore takes account of the amount of data transmitted from that queue, and from the system as a whole.

The process then passes to step 72, in which the data packet is transmitted, and then the process returns to step 52, in order to repeat the process in the next time slot.

There is thus disclosed a scheduler that reduces the schedule latency, and therefore uses the available bandwidth efficiently, while also having a high degree of short-term fairness. Moreover, the scheduler has low computational complexity and is easy to implement. Moreover, the scheduler can be used with variable length packets.

The invention claimed is:

1. A method for scheduling data packets in a packet data communication system, the method comprising:
   maintaining for each queue of a plurality of queues a respective deficit counter indicating a current data quota for the respective queue, and maintaining a global deficit counter; and
   during a time period in which at least one queue of said plurality of queues contains a packet of data having a first size to be sent:
   selecting one queue of said plurality of queues according to a queue scheduling process, wherein the selected queue contains the packet of data to be sent;
   increasing the deficit counter associated with the selected queue by a first fixed amount;
   increasing the global deficit counter by a second fixed amount;
   determining whether the deficit counter associated with the selected queue exceeds the first size and, if so,
   sending the packet of data from the selected queue;
   if the deficit counter associated with the selected queue does not exceed the first size, determining whether the deficit counter associated with the selected queue and the global deficit counter are both positive
   and, if so, sending the packet of data from the selected queue, otherwise,
   not sending the respective packet from the selected queue.

2. The method as claimed in claim 1, wherein the second fixed amount is equal to the first fixed amount.

3. The method as claimed in claim 1, further comprising, if the packet is sent from the selected queue:
   reducing the deficit counter associated with the selected queue by a size of said packet; and
   reducing the global deficit counter by the size of said packet.

4. A method for scheduling data packets the method comprising:
   identifying a first queue in a plurality of queues based on a first queue order of the plurality of queues, wherein the plurality of queues contains a plurality of data packets;

identifying a second queue in the plurality of queues based on a second queue order of the plurality of queues, wherein the second queue contains a first data packet of the plurality of data packets contained in the plurality of queues;

in response to the first queue containing a second data packet of the plurality of data packets contained in the plurality of queues, selecting the first queue;

in response to the first queue containing no data packet for transmission, selecting the second queue; and selecting from the selected queue a data packet for transmission.

5. The method as claimed in claim 4, wherein identifying the first queue comprises:

ordering the plurality of queues according to a first scheduling process to form the first queue order; and selecting one queue of the plurality of queues in the first queue order as the first queue.

6. The method as claimed in claim 5, wherein the first scheduling process comprises Generalized Processor Sharing scheduling.

7. The method as claimed in claim 5, wherein the first scheduling process comprises Worst-Case Fair Weighted Fair Queuing.

8. The method as claimed in claim 4, wherein identifying the second queue comprises:

ordering the plurality of queues according to a second scheduling process to form a second queue order; and in response to the first queue containing no data packet for transmission, selecting one of the plurality of queues in the second queue order as the second queue.

9. The method as claimed in claim 8, wherein each queue of said plurality of queues appears one or more consecutive times in said second queue order based on an amount of bandwidth allocated to said each queue of said plurality of queues.

10. The method as claimed in claim 8, wherein identifying a second queue further comprises:

in response to the selected one queue of the plurality of queues in the second queue order containing no data packet for transmission, selecting a next queue of the plurality of queues in the second queue order as the second queue.

11. The method as claimed in claim 4, further comprising determining whether to transmit the selected data packet based on whether a size of the selected packet exceeds an available data quota.

12. The method as claimed in claim 4, further comprising:

maintaining a current data quota associated with the selected queue;

in response to selecting the data packet for transmission from the selected queue, updating the current data quota; and transmitting the selected data packet in response to the updated current data quota being greater than a size of the selected data packet.

13. The method as claimed in claim 12, further comprising:

maintaining a total data quota associated with the first queue and the second queue;

updating the total data quota; and in response to the updated current data quota associated with the selected queue being less than or equal to the size of the selected data packet and further in response to the updated current data quota and the updated total data quota being greater than zero, transmitting the selected data packet from the selected queue.

14. A packet scheduler for scheduling data packets, the packet scheduler comprising:

a first scheduler operable to identify a first queue based on a first queue order of the plurality of queues, wherein the plurality of queues contains a plurality of data packets;

a second scheduler operable to identify a second queue that contains a first data packet of the plurality of data packets contained in the plurality of queues based on a second queue order of the plurality of queues; and a processor operable to:

in response to the first queue containing a second data packet of the plurality of data packets contained in the plurality of queues, select the first queue;

in response to the first queue containing no data packet for transmission, select the second queue; and select from the selected queue a data packet for transmission.

15. The packet scheduler as claimed in claim 14, wherein the first scheduler is operable to:

order the plurality of queues according to a first scheduling process to form the first queue order, and wherein the first scheduler is further operable to select one queue of the plurality of queues in the first queue order as the first queue.

16. The packet scheduler as claimed in claim 15, wherein the first scheduling process comprises a scheduling process selected from a group consisting of Worst-Case Fair Weighted Fair Queuing and Generalized Processor Sharing scheduling.

17. The packet scheduler as claimed in claim 14, wherein the second scheduler is operable to:

order the plurality of queues according to a second scheduling process to form the second queue order, and wherein said second scheduler is further operable to select one queue of the plurality of queues in the second queue order as the second queue in response to the first queue containing no data packet for transmission.

18. The packet scheduler as claimed in claim 17, wherein each queue of said plurality of queues appears one or more consecutive times in said second queue order based on an amount of bandwidth allocated to said each queue of said plurality of queues.

19. The packet scheduler as claimed in claim 14, wherein the processor is further operable to:

maintain a current data quota associated with the selected queue;

in response to selecting the data packet for transmission from the selected queue, update the current data quota; and transmit the selected data packet in response to the updated current data quota being greater than a size of the selected data packet.

20. The packet scheduler as claimed in claim 19, wherein the processor is further operable to:

maintain a total data quota associated with the first queue and the second queue;

update the total data quota; and in response to the updated current data quota associated with the selected queue being less than or equal to the size of the selected data packet and further in response to the updated current data quota and the updated total data quota being greater than zero, transmit the selected data packet.

* * * * *